US011299297B1

(12) United States Patent
Trainor (10) Patent No.: US 11,299,297 B1
(45) Date of Patent: Apr. 12, 2022

(54) MAGNETIC SHIELD SYSTEM FOR SPACECRAFT

(71) Applicant: Eamonn Patrick Trainor, Latham, NY (US)

(72) Inventor: Eamonn Patrick Trainor, Latham, NY (US)

(73) Assignee: TRAINOR AEROSPACE LLC, Albany, NY (US)

( * ) Notice: Subject to any disclaimer, the term of this patent is extended or adjusted under 35 U.S.C. 154(b) by 0 days.

(21) Appl. No.: 17/179,122

(22) Filed: Feb. 18, 2021

Related U.S. Application Data

(60) Provisional application No. 63/120,594, filed on Dec. 2, 2020.

(51) Int. Cl.
*B64G 1/54* (2006.01)
*B64G 1/42* (2006.01)

(52) U.S. Cl.
CPC ............ *B64G 1/543* (2013.01); *B64G 1/428* (2013.01)

(58) Field of Classification Search
CPC ............................... B64G 1/543; B64G 1/428
See application file for complete search history.

(56) References Cited

U.S. PATENT DOCUMENTS

| 7,464,901 B2* | 12/2008 | Kinstler | B64G 1/54 174/391 |
| 7,484,691 B2* | 2/2009 | Kinstler | G21F 5/00 174/391 |
| 8,550,406 B2* | 10/2013 | Bigelow | B64G 1/54 244/171.7 |
| 8,809,824 B1* | 8/2014 | Kinstler | G21F 3/00 244/171.1 |
| 10,633,121 B2* | 4/2020 | Trainor | B64G 1/543 |
| 10,815,016 B2* | 10/2020 | Williams | B64G 1/42 |

OTHER PUBLICATIONS

U.S. Appl. No. 17/037,201, filed Sep. 29, 2020—Eamonn Patrick Trainor (US Patent Application).

* cited by examiner

*Primary Examiner* — Valentina Xavier (57) ABSTRACT

A system to create a magnetic field or fields around the outside of a spacecraft to provide protection from cosmic and solar radiation. Electromagnets are placed within one or more layers of the outer shell or surface of a spacecraft and are used to generate magnetic fields. Side electromagnets are placed within one or more of the side layers of the outer shell or surface of the spacecraft and separate configurations of electromagnets are positioned within one or more layers of the outer shell or surface of the spacecraft, in a cross shaped configuration, either Quadrupole electromagnet configuration or two right-angled electromagnet configuration, at the front and rear of the spacecraft in geometric alignment with the opposite poled side positioned electromagnets. Magnetic field lines are channeled around the outside of the spacecraft by use of the right-angled electromagnet configuration or centered on the center of the quadrupole electromagnet configuration.

15 Claims, 6 Drawing Sheets

MAGNETIC SHIELD SYSTEM FOR SPACECRAFT

CROSS-REFERENCE TO RELATED APPLICATIONS

This application claims the benefit of provisional patent application Ser. No. 63/120,594, filed Dec. 2, 2020 by the present inventor.

BACKGROUND

Our planet, Earth, provides a natural magnetic field via churning (most probably), molten iron located not far beneath the Earth's surface. This has enabled non-aqueous, non-subterranean organic life to live on the surface and thrive, protected from the deleterious effects of solar and cosmic radiation reaching the ground. Earth's magnetic field (along with Earth's thick atmosphere) repels or redirects most cosmic and solar radiation from reaching the ground and thereby preventing damage to organic life living on the surface, such as breaking up DNA or destroying organic cells. Earth's magnetic field lines have no palpable effect (other than on compasses) on electronics, such as are found on airplanes or on the ground, because Earth's field lines are so far away from the Earth's surface due to the size of the Earth compared to the human scale and due to the relative weakness of those magnetic field lines.

However, humans venturing out beyond low Earth orbit or through the Van Allen belts (areas of charged particles and ions trapped within Earth's magnetic field) are subjected to both solar and cosmic radiation. The exposure of the human body to this radiation is detrimental to long term health and could probably prove fatal either in the short or long term. The Apollo astronauts only went on 12-day journeys, most of the time beyond Earth's magnetic field, and were fortunate not to have been traveling during a solar storm or flare outburst from our Sun, otherwise very high doses of radiation would have immersed the Apollo spacecraft. We need a way of protecting longer stay astronauts as they venture beyond low Earth orbit and outside of Earth's protective magnetic field.

There is a long felt but unresolved need for a way to protect human travelers venturing beyond the protective influence of Earth's magnetic field, where they will be exposed to the unfiltered cosmic and solar radiation on an ongoing basis. Otherwise, human crews will start to suffer adverse and, most probably, irreversible health consequences that may become a danger to the space mission, even during the space mission, and will have lifelong ill-effects on the people akin to radiation sickness, leukemia, and shortened life span. Crew affected by radiation overexposure during a space mission might not be able to maintain function of their spacecraft or will be too debilitated by the time they reach their destination. A way of counteracting this potentially space travel inhibiting scenario is now needed, especially since many space industry companies aim to venture out of low Earth orbit for considerable periods of time.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention generally relates to a way to provide a structured, contained, adjustable, practical, and effective way to create a uniform magnetic field surrounding the exterior sections of a spacecraft, space station or surface landing module of a spacecraft, that will protect the human habitation/sensitive electronics section or the entire spacecraft from solar and cosmic radiation.

The best solution to providing protection against this solar and cosmic radiation is to use magnetic fields such as we have with Earth's magnetic field. Magnetic field lines are capable of deflecting and redirecting the charged particles and ions that are components of solar and cosmic radiation. However, magnetic fields interfere with electronics if they come close enough to the electronics. For instance, you should not put a magnet on or near your computer processor. Of course, spacecraft are full of sensitive electronic equipment. In addition, sustained duration magnetic fields are not good for the human body and any such necessary exposure, such as in MM machines, is kept to the minimum amount required.

Magnetic fields cause charged particles to change their direction of motion. Such particles will spiral, in a helical fashion, around magnetic field lines and will follow those field lines. Energetic electrons and protons will follow magnetic field lines rather than cross them. Also, if field strength increases in the direction of motion, the field will exert a force to slow the charges. Cosmic rays will also follow spiral/helical paths when encountering a magnetic field.

Magnetic fields do not have to be all that strong. Earth's magnetic field is weak, but it works. Earth's magnetic field is only 0.25 to 0.65 Gauss (or 25,000 to 65,000 nano-Teslas) strong. A strong refrigerator magnet can produce 100 Gauss or 0.001 Teslas. Therefore, regular electromagnets are sufficient to produce a strong enough magnetic field to trap charged particles, which trapped charged particles will, in turn, help impede cosmic rays, such as gamma rays. The depth of magnetic field lines does not need to be great, so long as the field lines are sufficiently strong. Certainly, the magnetic field created by the electromagnets should be of greater strength than Earth's magnetic field as there will be virtually no distance to be travelled by cosmic or solar radiation from surrounding space to the outer shell of the spacecraft. Earth receives protection from cosmic and solar radiation due to the depth of Earth's magnetic field and due to the depth of Earth's atmosphere. However, that greater field strength should not require nuclear powered generation, as the spacecraft electromagnets should be able to produce a magnetic field of sufficient strength, stronger than Earth's magnetic field, but not a field strength as produced by superconducting electromagnets.

However, nothing prevents the use of nuclear power either, apart from health concerns. As stated, the electromagnets do not have to be of the super-conducting type, with all the super cooling and size of apparatus problems that brings. Field strengths, as obtained from super-conducting magnets will possibly not be needed. However, nothing prevents the use of super conducting electromagnets and such super conducting electromagnets can be used instead, if feasible. Therefore, each instance of electromagnet/s mentioned in this disclosure can also encompass superconducting magnets as well as all other electromagnets.

Toroid shaped magnets (basically a solenoid bent into a circle) have been mooted but they create field lines that will travel through the central hole of the toroid (a toroid being donut shaped) and hence will cause the field lines to travel through the main body of the spacecraft, which is not desirable for the human occupants or electronics and defeats the whole purpose of magnetic field protection, unless you have a donut shaped spacecraft. Hence, the present invention utilizes gaps between the magnets to not only avoid an enhanced toroid effect, but also due to design considerations.

Radar and communication signals can pass through magnetic fields, which allows spacecraft communications and navigation to be unimpeded by the presence of a magnetic field around the outside of the spacecraft. By limiting the magnetic field lines to the outer surface of the spacecraft, such lines are kept away from the people inside the spacecraft and from the electronics also inside the spacecraft. These are both desirable aims.

Thus, the present invention enables a system with magnetic field lines around the living quarters of a spacecraft, or any areas inhabited by people, and which may also contain sensitive electronic equipment. Long, thin electromagnets, are positioned within one or more layers of the outer shell or skin of the spacecraft around and close to the surface areas of the spacecraft, for instance, at each point of the compass around the outer surface of the spacecraft, along the spacecraft's longitudinal axis (for example, 4 electromagnet configuration). The longer an electromagnet is, the stronger the magnetic field created. Hence, such design is the preferential one to maximize field strength. In addition, the longer the electromagnets, the flatter will be the field lines created by those electromagnets and this is desirable for channeling the field lines and to avoid them trying to invade the human habitation section or main body of the spacecraft. The electromagnets are placed near the surface of the outer shell of the spacecraft, each parallel with the other. These electromagnets can run along substantially the length of the side of the spacecraft to provide maximum length field lines. These side electromagnets are equidistantly spaced apart. There can be any number of electromagnets used, for instance six or more running parallel along the length of the long axis of the human habitation section, although this might produce extra complications with the electromagnet configurations described now.

There are two arrangements by which this system can work and a third arrangement, which is the combination of the two other arrangements. One arrangement uses Quadrupole electromagnets placed at the front and rear of a spacecraft. The other arrangement uses two partially crossed over right-angled electromagnets placed at the front and rear of a spacecraft. A third arrangement combines quadrupole electromagnets at one end of the spacecraft and two crossed over right-angled electromagnets at the other end of the spacecraft. A Quadrupole electromagnet configuration or, alternatively, two right-angled electromagnets positioned directly one on top of the other, but at 180° to each other, are positioned both at the front and at the rear of the spacecraft and may be independently powered, so that the strength of each electromagnets can be different to the strength of each of the other electromagnets. All electromagnets can be incrementally or decrementally adjusted in power, either individually or all together. That is, the strength of the magnetic field lines can be gradually increased or decreased as required. The independence of electric power to each of the electromagnets also applies to the hybrid situation were a quadrupole electromagnet configuration is used at one end of the spacecraft and the two right-angled electromagnets, at 180° to each other are placed at the other end of the spacecraft.

If a Quadrupole electromagnet configuration is used, then magnetic field lines will be channeled into the center of the Quadrupole electromagnet configuration at the front and at the back of the spacecraft, space station or surface landing module, and detained there. If a right-angled electromagnet configuration is used, then magnetic field lines will be continuously circulated around the outside of the spacecraft, space station or landing module of the spacecraft. In the alternative, a Quadrupole electromagnet configuration can be used at one end of the spacecraft and the two right-angled electromagnets configuration used at the other end of the spacecraft at the same time. In other words, Quadrupole electromagnets are used at one end of the spacecraft, while, at the same time, the different configuration of right-angled electromagnets are used at the other end i.e. different configurations at each end simultaneously. Any of these configurations will avoid the creation of a north or a south pole at either the front or the rear of the spacecraft.

There is a gap between the side positioned electromagnets and the front and rear positioned electromagnets configurations and this avoids creating a toroid effect of field lines being channeled through the center of the spacecraft due to having a circular solenoid running around the complete length and breadth of the spacecraft. As previously stated, this disclosure relates not only to spacecraft but also space stations and surface landing modules of spacecraft.

One aspect of the present disclosure is directed to a system for creating a magnetic field or fields around a spacecraft, comprising: including electromagnets, positioned within one or more layers comprising the outer surface of a spacecraft, wherein the electromagnets are powered by and can be switched on or off through a powered electricity supply connected to the electromagnets; wherein electromagnets are positioned at equidistant positions from each other within one or more layers comprising the side outer surface of the spacecraft; wherein quadrupole electromagnets are positioned at the center of the front and at the center of the rear of the spacecraft within one or more layers comprising the outer surface of a spacecraft and the magnetic poles of the quadrupole electromagnets are in alignment with the magnetic poles of the electromagnets positioned within one or more layers comprising on the side outer surface of the spacecraft and are separated by a physical gap from the electromagnets positioned within one or more layers comprising on the side outer surface of the spacecraft. In one embodiment of the disclosure, the control of electrical power to the electromagnets is adjusted by use of a graduated power switch or device that allows the electrical power sent to the electromagnets to be gradually increased or decreased. In one embodiment of the disclosure, the layer within which the electromagnets are placed, has another layer below it facing into the interior of the spacecraft and that below facing layer is constructed with materials that will channel magnetic field lines though that layer to avoid dispersion of magnetic field lines into the interior or human habitation section or electronics of the spacecraft. In one embodiment of the disclosure, the quadrupole electromagnets can be placed within one of more layers of the outer shell or skin of the lid of a docking hatch or cover of the spacecraft, so that the docking hatch or cover can be opened and closed. In one embodiment of the disclosure, the side outer surface electromagnets run along the length of the living quarters/compartments.

Another aspect of the present disclosure is directed to a system for creating a magnetic field or fields around a spacecraft, comprising: including electromagnets, positioned within one or more layers comprising the outer surface of a spacecraft, wherein the electromagnets are powered by and can be switched on or off through a powered electricity supply connected to the electromagnets; wherein the electromagnets are positioned at equidistant positions from each other within one or more layers comprising the side outer surface of the spacecraft; wherein right-angled electromagnets are positioned at 180° to each other, opposite poles being 180° apart, at the center of the front and at the center of the rear within one or more layers comprising the outer surface of the spacecraft, and the magnetic poles of the right-angled electromagnets are in alignment with the magnetic poles of the electromagnets positioned within one or more layers comprising the side outer surface of the space craft and are separated by a physical gap from the electromagnets positioned within one or more layers comprising the side outer surface of the spacecraft.

Another aspect of the present disclosure is directed to a system for creating a magnetic field or fields around a spacecraft, comprising: including electromagnets, positioned within one or more layers comprising the outer surface of a spacecraft, wherein the electromagnets are powered by and can be switched on or off through a powered electricity supply connected to the electromagnets; wherein the electromagnets are positioned at equidistant positions from each other within one or more layers comprising the side outer surface of the spacecraft; wherein right-angled electromagnets are positioned at 180° to each other, opposite poles being 180° apart, at the center of the front of the spacecraft and quadrupole magnets are positioned at the center of the rear of the space craft, or these positions can be reversed, and the quadrupole electromagnets and the right-angled electromagents and the magnetic poles of the quadrupole and right-angled electromagnets are in alignment with the magnetic poles of the electromagnets positioned within one or more layers comprising the side outer surface of the spacecraft and are separated by a physical gap from the electromagnets positioned within one or more layers comprising on the side outer surface of the spacecraft.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 1 is a perspective front view of a spacecraft as if you are looking down towards the top of the front of the spacecraft. This view shows a circular enclosed section in the middle of the front that simulates the cover for the docking hatch for the spacecraft. This circular enclosed section has quadrupole magnets (four electromagnets) in an overall cross shaped configuration with polarities being opposite to the polarities of the geometrically aligned side electromagnets. These quadrupole magnets are placed beneath the outer surface of the spacecraft and are depicted by dashed lines as they are placed underneath the outer shell of the spacecraft. Gaps exist for the center docking hatch cover to be to be opened for docking. Side or long axis electromagnets running along the inner surface of the outer shell of the spacecraft skin are also visible as dashed lines. Magnetic field lines are shown.

FIG. 4 is a perspective front view of a spacecraft as if you are looking down towards the top of the front of the spacecraft. This view shows a circular enclosed section in the middle of the front that simulates the cover for the docking hatch for the spacecraft. This circular enclosed section has two partially overlapping, right-angled electromagnets positioned at 180° to each other in a cross shaped configuration with polarities being aligned to opposite polarities of the geometrically aligned side electromagnets. They are depicted by dashed lines as they are placed underneath the outer shell of the skin of the spacecraft. Gaps exist for the center docking hatch cover to be to be opened for docking. Side electromagnets running beneath the side or long axis of the spacecraft are also made visible by dashed lines. Magnetic field lines are shown.

REFERENCE NUMERALS

12 Electromagnet (showing N=North magnetic pole, S=South magnetic pole)

13 Cover to a docking hatch for the spacecraft
14 Front view of spacecraft
15 Side view of spacecraft
16 Rear view of spacecraft
17 Magnetic Field Lines

DETAILED DESCRIPTION

The present invention generally relates to providing a magnetic shield around a spacecraft to deflect cosmic and solar radiation away from the spacecraft and thereby protect the human occupants of the spacecraft from radiation exposure.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
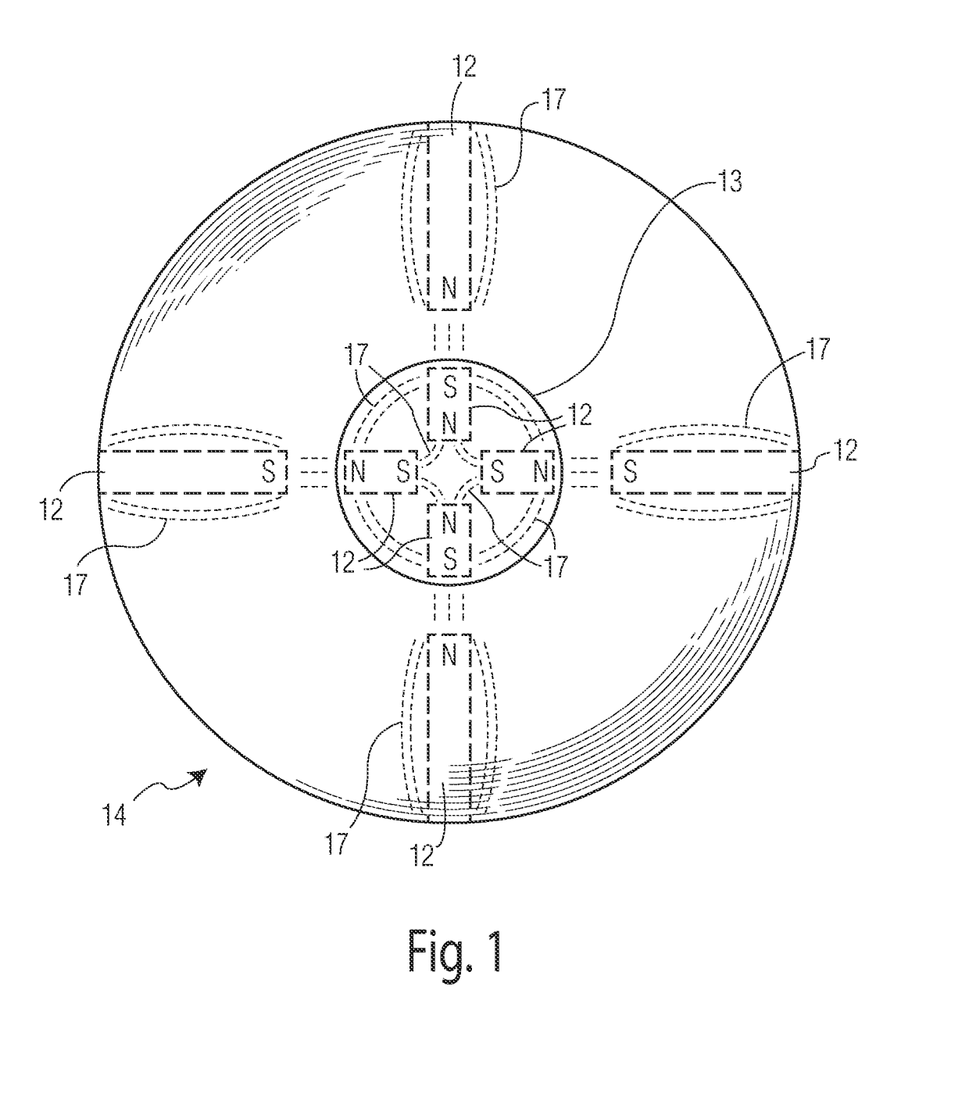

Referring to FIG. 1, shows a front view perspective 14 of the spacecraft with quadrupole electromagnets 12 placed at the front 14 of the spacecraft, to continue the magnetic field lines 17 of the geometrically aligned side placed opposite poled electromagnets 12, to avoid breakage or stoppage to those field lines and which field lines 17 will be channeled and will continue to direct charged particles along those field lines and channel them into the center of the quadrupole electromagnet configuration. This will prevent the field lines creating magnetic poles at the front or back of the spacecraft and therefore preventing the magnetic field lines from seeking to return to the opposite pole via the shortest route, through the body of the spacecraft. Instead, the field lines will converge in the center of the quadrupole electromagnet configuration. Any trapped charged particles, and cosmic radiation which is in turn trapped by the charged particles, will be corralled together at the center of the quadrupole electromagnet configuration and they will remain trapped there. The strength of electric current sent to the quadrupole electromagnets, as well as the independently powered side electromagnets, is on an adjustable slider dial/switch or incremental control device. In other words, a dimmer switch to increase or decrease electrical power and therefore increase or decrease magnetic field strength gradually. All electromagnets used can be independently powered and their field strengths independently adjusted. By gradual reduction of electrical power to the quadrupole electromagnets alone, or also to all other electromagnets 12 at the same time, it will be possible to cause a condition or conditions for the dispersal of the trapped charged particles to go back into surrounding space and away from the spacecraft by encouraging charged particles, no longer trapped in the upper layers of the magnetic field lines i.e. those lines furthest from the outer shell of the surface of the spacecraft, to instead follow trajectories away from the spacecraft. In addition, gaps between the electromagnets 12 will prevent an electromagnetic toroid effect which would channel the field lines through the center of such a ring-shaped magnet and through the main body of the spacecraft. Quadrupole Electromagnet configuration is shown placed within the docking hatch cover 13 of the spacecraft, as an example. The Quadrupole electromagnets can be placed, generally, at the center of the front end of the spacecraft, as well as the center of the rear end of the spacecraft. This electromagnet arrangement is shown in dashed lines, as this arrangement will be contained within one or more layers of the outer shell or skin of the spacecraft. Polarities of the electromagnets are shown however these polarities can be reversed in each instance in any configuration.

The shells or skins of spacecraft are constructed from several layers of protective materials e.g., aluminum etc. The electromagnets 12 are permanently placed beneath the outer skin or shell of the spacecraft. They are built into one or more layers comprising the outer skin or shell of the spacecraft and remain immobile where placed and are built into the fabric of the shell or skin of the spacecraft. This means there is no mechanism needed to project them out from the outer shell of the spacecraft. The electromagnets can be placed in any gaps in the layers e.g., insulation gaps, such as the Apollo Command module had, or alternatively can be built into the fabric of a layer or layers. Due to the electromagnets 12 being long and thin, they should be able to be non-disruptive of the contours of whatever layer they are built into and can be laid with the electromagnets' flatter side being in the same plane as the layer itself. The layer within which the electromagnets 12 are placed, has a another layer beneath it facing into the interior of the spacecraft and that below facing layer is constructed with materials that will block or channel magnetic field lines 17 tending to go through that layer to avoid dispersion of interior facing field lines being spread into the living quarters or electronics of the spacecraft. Materials that can be used for the layer of spacecraft skin beneath the layer containing the electromagnets would be MU-metals, steel or a ferromagnetic metal. This disclosure, as outlined before and after in this detailed description, relates not only to spacecraft but also space stations and surface landing modules of spacecraft.

Figure 2:
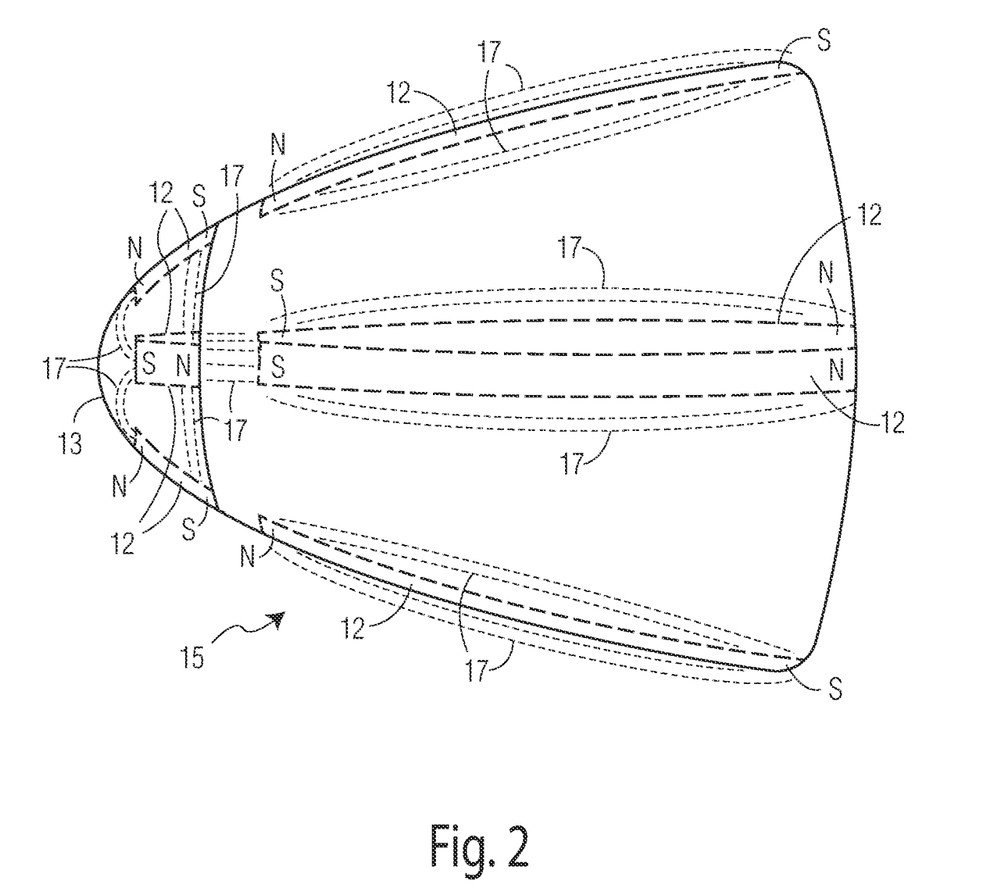
FIG. 2 is a perspective side view of a spacecraft showing long electromagnets running along most of the side or long axis length of the spacecraft beneath the shell of the outer skin of the spacecraft with gaps near the front to allow the opening of a cover to a docking hatch of the spacecraft. Quadrupole arranged electromagnets are partially visible at the front of the spacecraft. All electromagnets are depicted by dashed lines as they are placed underneath the outer shell of the skin of the spacecraft. The side electromagnets are geometrically aligned with the opposite polarity electromagnets at the front and rear of the spacecraft. Magnetic field lines are shown.

Referring to FIG. 2, a side perspective view is shown of a spacecraft which shows the arrangement of side positioned electromagnets 12 running along the inside of the layers comprising the outer shell of the spacecraft 15. These electromagnets 12 are contained within one or more layers of the outer shell or skin of the spacecraft. Polarity of the magnets is shown. However, each instance of polarity can be reversed in any configuration. These side positioned electromagnets 12 will be geometrically aligned with the quadrupole electromagnets configuration placed both at the front 14 and rear 16, of the spacecraft. The partially visible side view of the electromagnet configuration shown as visible at the front of the spacecraft represents the quadrupole electromagnets configuration. This electromagnet arrangement is shown in dashed lines, as this arrangement will be contained within one or more layers of the outer shell or skin of the spacecraft. Polarities of the electromagnets are shown however these polarities can be reversed in each instance in any configuration.

In one embodiment, the system includes four or more long electromagnets 12 (in one instance placed at points equidistantly north, south, east, west looking down on the long axis or body of the spacecraft). In other words, four electromagnets running along the long axis of the spacecraft. However, any number of electromagnets can be used, although this might produce complications with electromagnet configurations at the front and back of the spacecraft in terms of geometrically aligning opposite poles between side, front and rear positioned electromagnets. Also, by having the electromagnets contained within one of the layers of the outer shell of the spacecraft you can prevent the possibility of a protruding portion of the spacecraft colliding with any other structure during a docking sequence of maneuvers.

The electromagnets are just inside the shell of the spacecraft which will protect them in the event of the spacecraft passing through an atmosphere during take-off or landing. This will prevent damage to the electromagnets from accumulated atmospheric friction and heat build-up and protect the spacecraft overall. In addition, there are no moving parts involved and that extra complication to the system is removed.

Use of long, thin electromagnets 12 will increase the strength of the field 17 created, as does increasing the electrical charge to the electromagnet 12. Longer, thinner electromagnets create stronger field lines than shorter electromagnets. Also, longer, thinner electromagnets create flatter magnetic field lines, which is more useful in channeling those lines away from the interior of the spacecraft. The electricity is then sent to the electromagnets 12 and the strength of electric current sent to them is on an adjustable slider dial/switch or incremental control device. In other words, a dimmer switch to increase or decrease electrical power and therefore increase or decrease magnetic field strength gradually. For instance, an increase in electrical power will be needed to increase the magnetic field strength of the electromagnets 12 when solar flares occur, which will give off greatly increased solar radiation pressure. This will be necessary to protect the astronauts and, also very importantly, the electronic equipment used to control the spacecraft, from greatly increased solar radiation. In addition, as explained earlier, the gradual reduction of magnetic field strength will enable the dissipation of trapped charged particles away from the spacecraft or space station, that are otherwise caught in the magnetic field lines 17, by allowing the charged particles, and cosmic radiation trapped among the charged particles, an unimpeded path, in the direction away from the spacecraft.

In one embodiment, the system includes magnetic fields 17 created by electromagnets 12 that will stop most solar and cosmic radiation. However, about 1% of cosmic radiation (gamma rays, x-rays, and neutrinos) are not stopped by magnetic fields. However, it has been shown that cosmic radiation, such as gamma rays, will interact with trapped charged particles, for instance from trapped solar radiation, that are already caught in the magnetic fields 17 around the spacecraft. A magnetic field 17 around a spacecraft will trap charged particles from the Sun and will create mini-Van Allen belts. This will copy the behavior of the Van Allen belts which are formed in Earth's magnetic field. The Van Allen belts are areas of trapped, charged particles at locations around and within Earth's magnetic field. These mini-Van Allen belt type accumulations of trapped charged particles in the magnetic fields around a spacecraft will also help stop a lot of cosmic gamma radiation. Ultra-violet radiation can be stopped by other means e.g., synthetic fabrics lining built into the shell of a spacecraft or various painted applied blocking elements.

It will be necessary to get rid of the otherwise trapped charged particles caught in these mini-Van Allen type belts, created at the center of the Quadrupole electromagnet configuration at the front and/or rear of the spacecraft or other areas within the magnetic fields around the spacecraft, as these charged particles remain a danger to human occupants and the electronic equipment. To enable the charged particles to escape into paths that will take them on trajectories away from the spacecraft, the equivalent of a dimmer switch is used to control a graduated amount of electricity going to the electromagnets to slowly reduce the strength of the created magnetic fields 17. This will create a condition that will allow the trapped particles to eventually find a trajectory for escape into free space, initially this will first affect trapped particles (solar or cosmic radiation) caught in magnetic field lines 17 furthest away from the outer shell of the spacecraft, as those magnetic field lines 17 will weaken first with any reduction of power to the electromagnets 12. The charged particles are still deterred from crossing the remaining magnetic field lines, but they will find an escape route with any trajectory outwards away from the magnetic field lines and into space away from the spacecraft. This process is repeated as the furthest away magnetic field lines 17 lose more strength sequentially down to the innermost or closest facing magnetic field lines 17 adjacent to the outer shell of the spacecraft. In addition, the electricity to power the electromagnets 12 can also be gradually increased as needed, for instance in solar flare occurrences.

There is a physical gap between the side electromagnets 12 and the correspondingly geometrically aligned cross shaped quadrupole or right-angled configuration of electromagnets 12 at the front 14 and back 16, of the spacecraft. This avoids a toroid effect that would cause channeling field lines through the center of the spacecraft (as through the center of a doughnut shape) and also allows for easy the opening of docking hatches etc.

Figure 3:
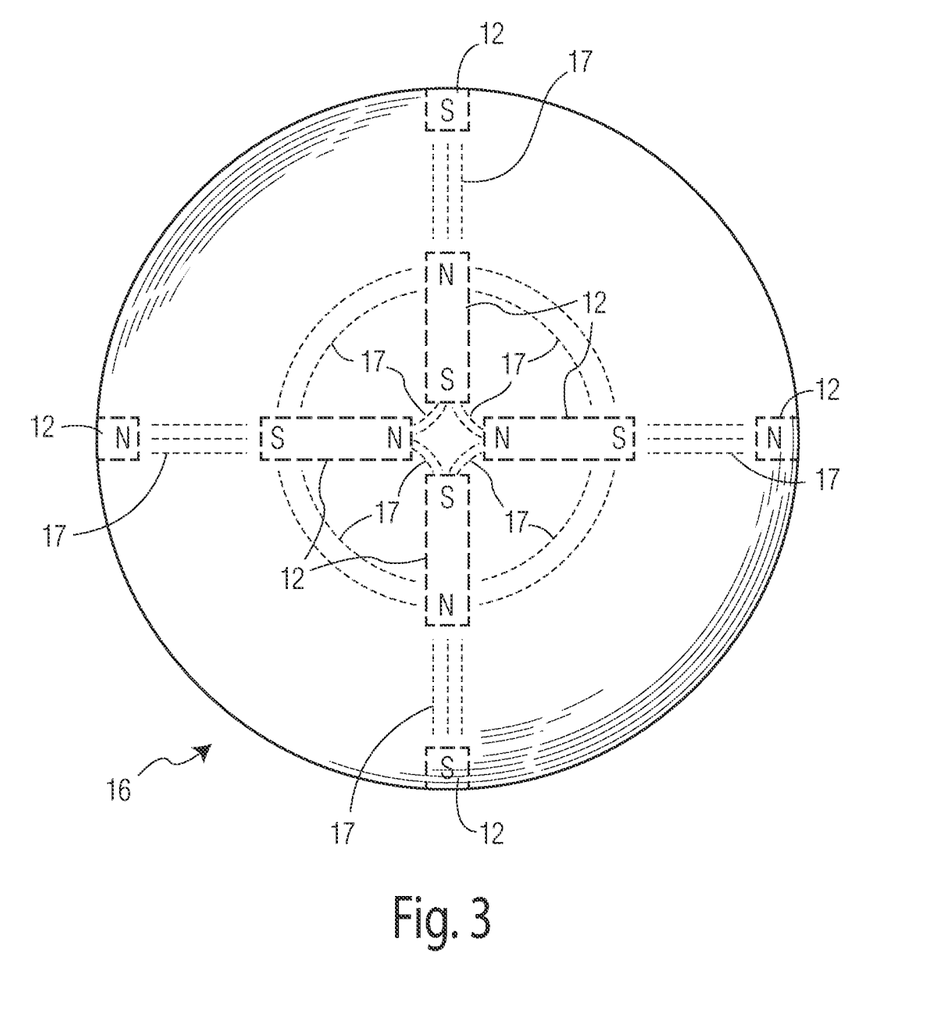
FIG. 3 is a perspective rear view of a spacecraft, as if you were looking at the bottom side of the spacecraft from below, showing centrally placed quadrupole magnets (four electromagnets) in a cross shaped configuration, placed beneath the outer shell or skin of the spacecraft, with polarities being opposite polarities of the geometrically aligned side electromagnets. They are depicted by dashed lines as they are placed underneath the shell of the outer skin of the spacecraft. Side electromagnets running along the inner side or long axis surface of the spacecraft are also made visible by dashed lines as they are placed beneath the outer shell or surface of the spacecraft. Magnetic field lines are shown.

Referring to FIG. 3, shows a rear-view perspective of the spacecraft with quadrupole electromagnets 12 in a cross shaped configuration at the center of the rear 16 of the spacecraft. This electromagnet arrangement is shown in dashed lines, as this arrangement will be contained within one or more layers of the outer shell or skin of the spacecraft. Polarities of the electromagnets are shown however these polarities can be reversed in each instance in any configuration. Magnetic shield protection at the rear will be needed, for instance, when the capsule is detached from the rest of the complete spacecraft. As already stated, each electromagnet 12 positioned at the front 14 and rear 16, of the spacecraft, should have its north/south poles geometrically aligned to an opposite poled, side positioned electromagnet 12 to allow a continuous line around the spacecraft. In other words, a south pole should always face a north pole and a north pole should always face a south pole. This arrangement necessitates a side positioned electromagnet 12 to be on the same geometrical alignment with a corresponding opposite pole of one of the quadrupole magnets placed at the rear 16 and front 14, of the spacecraft to continue the magnetic field lines from the side electromagnets straight towards the Quadrupole electromagnets. The field lines emanating from the interior facing side of the Quadrupole configuration will be channeled to the center of the quadrupole electromagnet configuration where the field lines will stop or be corralled, and any potential charged particles will be trapped there before they are released back into space by slow reduction of the power of the magnetic field either just at the back or front of the spacecraft or at all outer points of the spacecraft. The use of a quadrupole electromagnetic configuration will not only corral all magnetic field lines 17 to a central area geographically situated in the center of the quadrupole electromagnet configuration but will also avoid the creation of north or south poles at either the front or back of the spacecraft and which would cause the magnetic field lines to return to an opposite pole at the other end of the spacecraft, through the body of the spacecraft. Thus, that would introduce magnetic field lines 17 through the habitation quarters which would defeat the purpose of protecting inhabitants from cosmic and solar radiation. Use of quadrupole electromagnets overcomes this problem.

Figure 4:
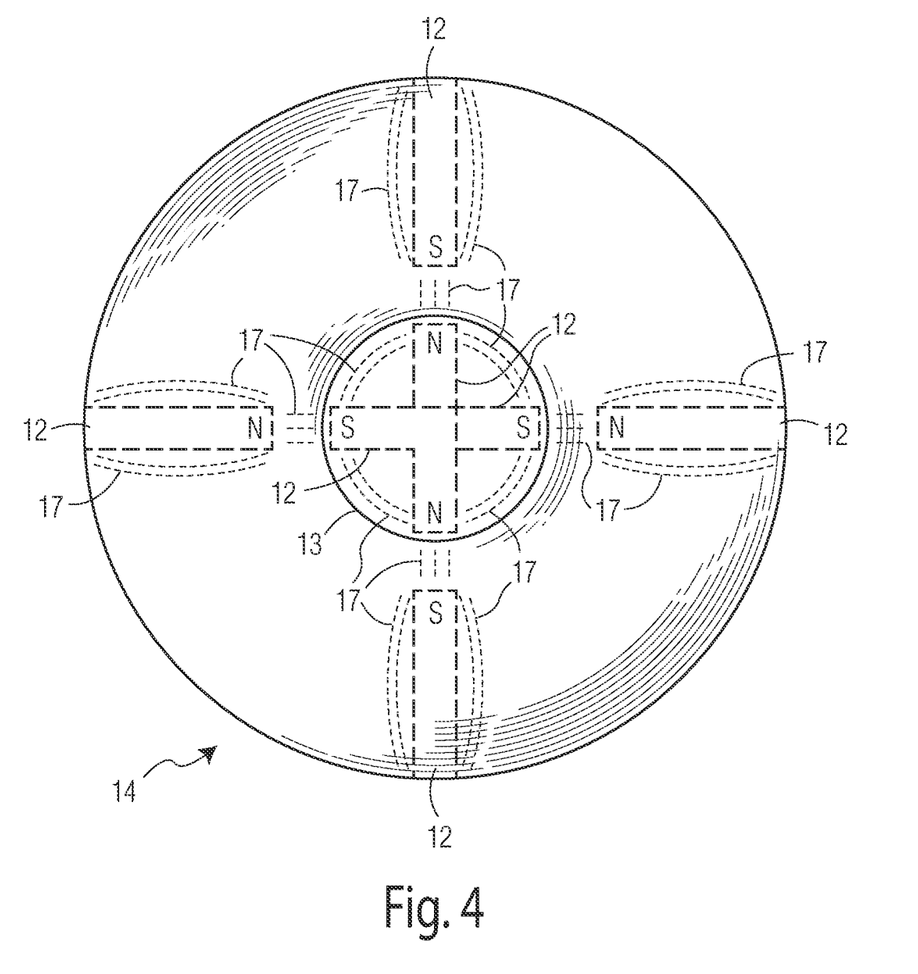

Referring to FIG. 4, is a front perspective view 14 of a spacecraft showing electromagnets 12 with poles of the electromagnets being indicated. Right-angled electromagnets are placed at placed at 180° to each other and partially crossing over each other at the 90° bends of those two right-angled electromagnets, to form the equivalent of a four-pronged electromagnet in a cross shaped configuration, as shown in the center of the front 14, of the spacecraft. The magnetic poles of these right-angled electromagnets will also be positioned 180° apart. In other words, a north pole will always be 180° apart from the other north pole, same for south poles, on the double right-angled electromagnet configuration. This electromagnet arrangement is shown in dashed lines, as this arrangement will be contained within one or more layers of the outer shell or skin of the spacecraft. Polarities of the electromagnets are shown however these polarities can be reversed in each instance in any configuration. In this instance, the cross shaped configuration is seen placed within the cover of a docking hatch cover 13 but can be placed generally in the center of the front end and the center of the rear end of a spacecraft. There is a break in the continuous lines of the geometrically aligned side placed electromagnets 12 to allow for the docking hatch cover 13 to be opened and closed, for instance via a hinged mechanism and to avoid a toroid effect. Even if a docking hatch is not located at the front or rear of the spacecraft, there is a physical gap between front and rear and side electromagnets. These electromagnets are permanently placed within one of the layers of the outer shell or skin of the spacecraft.

These right angled electromagnets placed at 180° to each other in a cross shaped configuration at the front and back of the spacecraft, will continue the field lines of the geometrically aligned side placed electromagnets 12, to avoid the breakage or stoppage to those field lines 17 and which field lines will be channeled and will continue to direct charged particles along those field lines, across the front of the spacecraft 14 and channel them back along the sides of the spacecraft 15 and eventually across the rear of the spacecraft 16. The magnetic field lines, upon reaching a right-angled electromagnet, will be bent 90° in their paths from the input providing side placed electromagnets, that is the receiving pole of each right-angled electromagnet with a pole that is aligned with its nearest corresponding, opposite poled, side electromagnet, and then the magnetic field lines will be directed towards the opposite pole of that right-angled electromagnet and from there they will be channeled onto the side electromagnet nearest to the other pole of that right-angled electromagnet, which will be placed 90° away from the other input providing side electromagnet. The magnetic field lines will then continue along the corresponding side electromagnet. The magnetic field lines 17 will continuously orbit around the spacecraft channeled by the side electromagnets 12 and front and rear positioned right-angled electromagnets configurations. Accordingly, any trapped charged particles and additionally any cosmic radiation trapped within the charged particles, will continue to continuously circle around the outer perimeter of the spacecraft, until given an opportunity to take trajectories away from the spacecraft by the gradual reduction of magnetic field strength by the occupants of the spacecraft.

The magnetic field lines 17 will travel to the back of the spacecraft 16 in a continuous line. When the magnetic field lines reach the rear of the spacecraft, they will continue their path through opposing poles on right-angled electromagnets placed at 180° to each other to form a cross shaped configuration at the rear of the spacecraft 16 geometrically aligned with the direction of the field lines coming towards the rear from the corresponding side placed electromagnets 12 and this returns those field lines to the nearest opposite pole on geometrically aligned electromagnets 12 placed 90° away from the input providing side electromagnet within one of the layers in the side of the spacecraft. A north pole from a side electromagnet will face a south pole in the geometrically aligned right-angled electromagnet cross shaped configuration and vice versa. This will cause any magnetic field lines 17 to continue along the outside of the spacecraft rather than try to return through the body of the spacecraft, such as happens when you create magnetic poles. The north/south poles of the cross shaped magnets at the front and the rear of spacecraft are positioned in geometric alignment with the side positioned electromagnets, with opposite magnetic poles facing each other, to allow the continuance of the field lines from the side electromagnets 12 to pass across the front of the spacecraft 14 and pass across the rear of the spacecraft 16 and continue in motion around the outside of the spacecraft. The magnetic poles of the right-angled electromagnets will also be positioned 180° apart. Trapped charged particles will either continuously orbit the spacecraft by following the magnetic field lines or will cause areas of higher concentration at certain points (as happens with the Van Allen belts around the Earth). Once again, by gradual reduction of power to the electromagnets, any trapped charged particles can find escape trajectories away from the body of the spacecraft. This electromagnet configuration also prevents the creation of north or south poles, at the front or back of the spacecraft, which would cause the magnetic field lines to return to an opposite pole, through the body of the spacecraft. Thus, that would introduce magnetic field lines 17 through the habitation quarters which would defeat the purpose of protecting inhabitants from cosmic and solar radiation. Use of right-angled electromagnets in this configuration overcomes this problem.

Physical gaps or spaces between the electromagnets 12 placed on the side of the spacecraft and those geometrically aligned electromagnets 12 placed at the front and back of the spacecraft, will also prevent creating a toroid effect of an unbroken electromagnet forming a complete, unbroken circle, in other words a doughnut shape. This will avoid magnetic field lines being channeled through the center of the doughnut shaped electromagnet and thus such field lines traveling through the center of the donut which would otherwise be the main body of the spacecraft.

Figure 5:
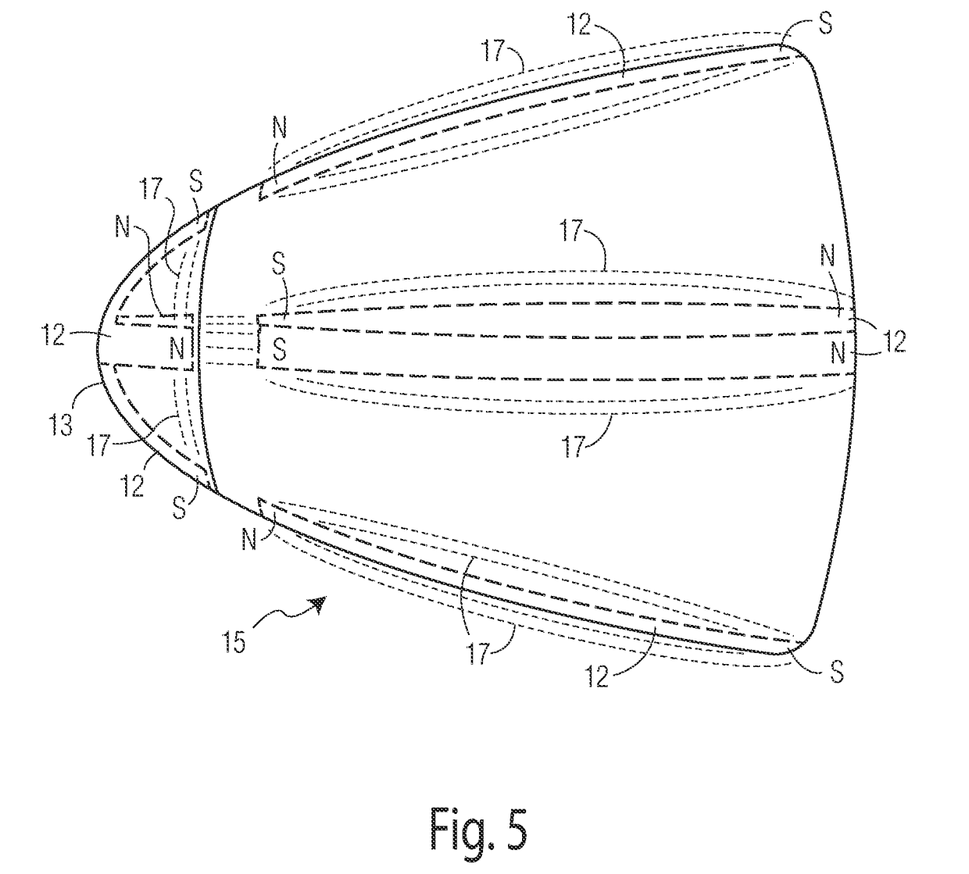
FIG. 5 is a perspective side view of a spacecraft showing long electromagnets running most of the side or long axis length of the spacecraft beneath the shell of the outer skin of the spacecraft with gaps near the front to allow the opening of a cover to a docking hatch for the spacecraft. The two right-angled electromagnets configuration are partially visible at the front of the spacecraft. All electromagnets are depicted by dashed lines as they are placed underneath the outer shell of the skin of the spacecraft. The side electromagnets are geometrically aligned with the opposite polarity electromagnets at the front and rear of the spacecraft. Magnetic field lines are shown.

Referring to FIG. 5, a side perspective view is shown of a spacecraft which shows the arrangement of side positioned electromagnets 12 running along the inside of the layers comprising the outer shell of the spacecraft 15. These electromagnets are contained within one or more layers of the outer shell or skin of the spacecraft. Polarity of the magnets is shown. However, each instance of polarity can be reversed in any configuration. These side positioned electromagnets 12 will be geometrically aligned with the right-angled electromagnet configurations placed at the front and rear of the spacecraft. The partially visible electromagnets configuration, shown as visible at the front 14 of the spacecraft, represents the right-angled electromagnets configuration. This electromagnet arrangement is shown in dashed lines, as this arrangement will be contained within one or more layers of the outer shell or skin of the spacecraft.

Figure 6:
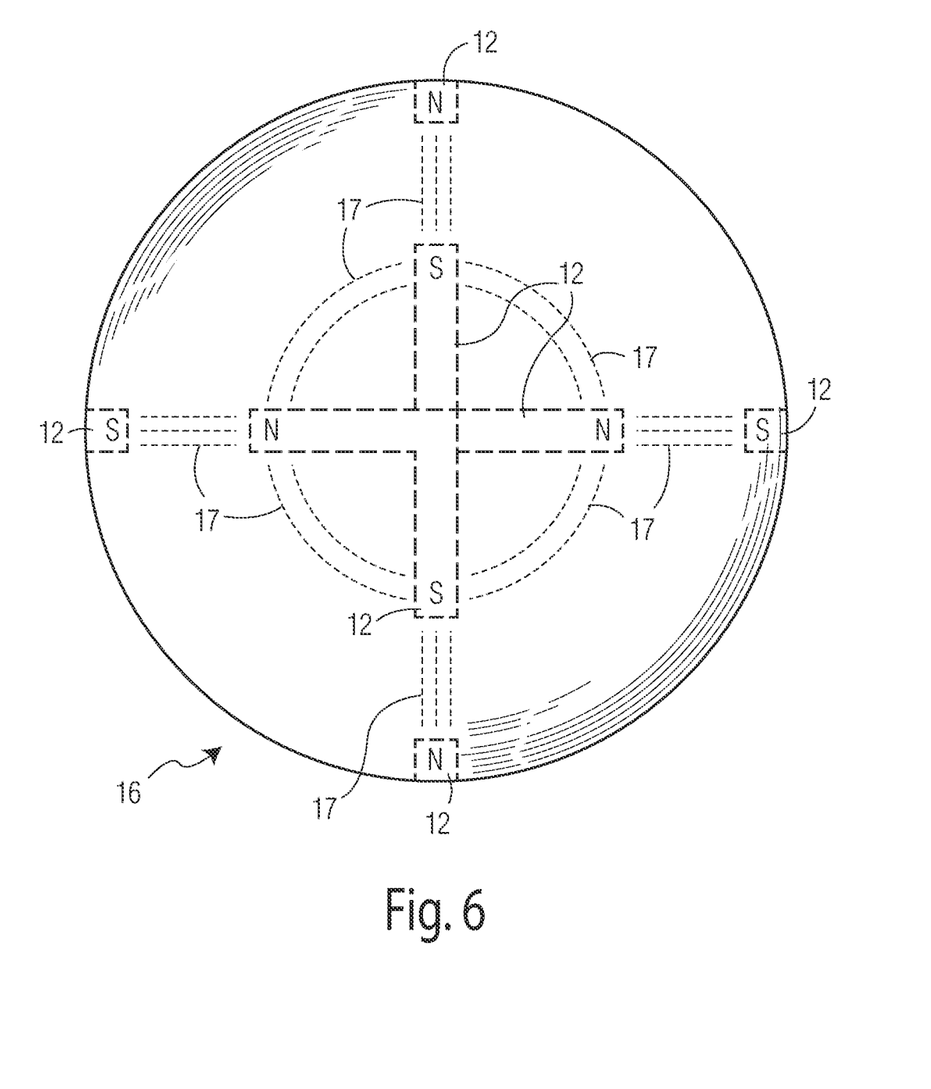
FIG. 6 is a perspective rear view of a spacecraft, as if you were looking at the bottom side of the spacecraft from below, showing two centrally placed, partially overlapped, right-angled electromagnets positioned at 180° to each other in a cross shaped configuration with polarities being opposite polarities of the geometrically aligned side electromagnets. They are depicted with dashed lines as they are placed underneath the outer shell of the skin of the spacecraft. Side electromagnets running along beneath the outer surface of the spacecraft are also visible with dashed lines. Magnetic field lines are shown.

Referring to FIG. 6 right-angled shaped electromagnets 12, each positioned at 180° degrees to each other, are positioned at the rear 16 of the spacecraft. The polarities of the right-angled electromagnets will also be 180° apart. This placement of right-angled electromagnets, in this configuration, will allow magnetic field lines 17 to be channeled around and across the rear of the spacecraft 16 from each of the geometrically aligned opposite poled and side positioned electromagnets 12 and across the rear of the spacecraft 16 and onto the correspondingly aligned side electromagnets 12, placed at 90° angles to the input providing other side electromagnet within a layer or layers of the side of the spacecraft. The magnetic field lines, upon reaching a right-angled electromagnet, will be bent 90° in their paths from the input providing side placed electromagnet, that is the receiving pole of each right-angled electromagnet with a pole that is aligned with its nearest corresponding, opposite poled, side electromagnet, and then the magnetic field lines will be directed towards the opposite pole of that right-angled electromagnet and from there they will be channeled onto the side electromagnet nearest to the other pole of that right-angled electromagnet, which will be placed 90° away from the other input providing side electromagnet. The magnetic field lines will then continue along the corresponding side electromagnet. Trapped charged particles will continue to orbit around the spacecraft via the orbiting magnetic field lines 17 until they are released back into space by slow reduction of the power of the magnetic field at all outer points of the spacecraft. Also, the creation of north or south poles at the front or rear of the spacecraft is avoided and this prevents magnetic field lines returning through the body of the spacecraft to an opposite pole at the other end of the spacecraft. This electromagnet arrangement is shown in dashed lines, as this arrangement will be contained within one or more layers of the outer shell or skin of the spacecraft. Gaps exist between the side placed electromagnets 12 and the right-angled electromagnet configuration at the rear of the spacecraft. This is done to avoid the causation of a toroidal effect of a circular solenoid channeling field lines through the center of the doughnut shaped toroid, that is, through the center of the spacecraft.

Another aspect of the present disclosure is directed to a system for creating a magnetic field or fields around a spacecraft, wherein right-angled electromagnets, positioned at 180° to each other, can be positioned at the front of the spacecraft 14 and a quadrupole electromagnet configuration can be placed at the rear of the spacecraft 16, or these positions can be reversed. All electromagnets are placed beneath the outer surface or skin of the spacecraft in one or more layers comprising the outer surface or skin of the spacecraft. In each instance, the electromagnets 12 at the front and rear of the spacecraft are separated by a physical gap from the geometrically aligned, opposite poled electromagnets 12 positioned along the side surface of the spacecraft. Polarities can also be reversed.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A system for creating a magnetic field or fields around a spacecraft, comprising:
   including electromagnets, positioned within one or more layers comprising the outer surface of a spacecraft, wherein the electromagnets are powered by and can be switched on or off through a powered electricity supply connected to the electromagnets;
   wherein electromagnets are positioned at equidistant positions from each other within one or more layers comprising the side outer surface of the spacecraft;
   wherein quadrupole electromagnets are positioned at the center of the front and at the center of the rear of the spacecraft within one or more layers comprising the outer surface of a spacecraft and the magnetic poles of the quadrupole electromagnets are in alignment with the magnetic poles of the electromagnets positioned within one or more layers comprising on the side outer surface of the spacecraft and are separated by a physical gap from the electromagnets positioned within one or more layers comprising on the side outer surface of the spacecraft.

2. The system of claim 1, wherein the control of electrical power to the electromagnets is adjusted by use of a graduated power switch or device that allows the electrical power sent to the electromagnets to be gradually increased or decreased.

3. The system of claim 1, wherein the layer within which the electromagnets are placed, has another layer below it facing into the interior of the spacecraft and the below facing layer is constructed with materials that will channel magnetic field lines though that layer to avoid dispersion of magnetic field lines into the interior or human habitation section or electronics of the spacecraft.

4. The system of claim 1, wherein the quadrupole electromagnets can be placed within one of more layers of the outer shell or skin of the lid of a docking hatch or cover of the spacecraft, so that the docking hatch or cover can be opened and closed.

5. The system of claim 1, wherein the side outer surface electromagnets run along the length of the living quarters/compartments.

6. A system for creating a magnetic field or fields around a spacecraft, comprising:
   including electromagnets, positioned within one or more layers comprising the outer surface of a spacecraft, wherein the electromagnets are powered by and can be switched on or off through a powered electricity supply connected to the electromagnets;
   wherein the electromagnets are positioned at equidistant positions from each other within one or more layers comprising the side outer surface of the spacecraft;
   wherein right-angled electromagnets are positioned at 180° to each other, opposite poles being 180° apart, at the center of the front and at the center of the rear within one or more layers comprising the outer surface of the spacecraft, and the magnetic poles of the right-angled electromagnets are in alignment with the magnetic poles of the electromagnets positioned within one or more layers comprising the side outer surface of the space craft and are separated by a physical gap from the electromagnets positioned within one or more layers comprising the side outer surface of the spacecraft.

7. The system of claim 6, wherein the control of electrical power to the electromagnets is adjusted by use of a graduated power switch or device that allows the electrical power to the electromagnets to be gradually increased or decreased.

8. The system of claim 6, wherein the layer within which the electromagnets are placed, has a another layer below it facing into the interior of the spacecraft and that below facing layer is constructed with materials that will channel magnetic field lines though that layer to avoid dispersion of magnetic field lines into the interior or human habitation section or electronics of the spacecraft.

9. The system of claim 6, wherein the right-angled electromagnets can be placed within one of more layers of the outer shell or skin of the lid of a docking hatch or cover of the spacecraft, so that the docking hatch or cover can be opened and closed.

10. The system of claim 6, wherein the side outer surface electromagnets run along the length of the living quarters/compartments.

11. Another aspect of the present disclosure is directed to a system for creating a magnetic field or fields around a spacecraft, comprising: including electromagnets, positioned within one or more layers comprising the outer surface of a spacecraft, wherein the electromagnets are powered by and can be switched on or off through a powered electricity supply connected to the electromagnets; wherein the electromagnets are positioned at equidistant positions from each other within one or more layers comprising the side outer surface of the spacecraft;
wherein right-angled electromagnets are positioned at 180° to each other, opposite poles being 180° apart, at the center of the front of the spacecraft and quadrupole magnets are positioned at the center of the rear of the space craft, or these positions can be reversed, and the quadrupole electromagnets and the right-angled electromagents and the magnetic poles of the quadrupole and right-angled electromagnets are in alignment with the magnetic poles of the electromagnets positioned within one or more layers comprising the side outer surface of the spacecraft and are separated by a physical gap from the electromagnets positioned within one or more layers comprising on the side outer surface of the spacecraft.

12. The system of claim 11, wherein the control of electrical power to the electromagnets is adjusted by use of a graduated power switch or device that allows the electrical power to the electromagnets to be gradually increased or decreased.

13. The system of claim 11, wherein the layer within which the electromagnets are placed, has a another layer below it facing into the interior of the spacecraft and that below facing layer is constructed with materials that will channel magnetic field lines though that layer to avoid dispersion of magnetic field lines into the interior or human habitation section or electronics of the spacecraft.

14. The system of claim 11, wherein the quadrupole electromagnets or right-angled electromagnets can be placed within one of more layers of the outer shell or skin of the lid of a docking hatch or cover of the spacecraft, so that the docking hatch or cover can be opened and closed.

15. The system of claim 11, wherein the side outer surface electromagnets run along the length of the living quarters/compartments.

* * * * *